United States Patent [19]  [11] 3,914,191
Scott  [45] Oct. 21, 1975

[54] METHYL FORMATE-TRICHLOROMONOFLUOROMETHANE BLOWING AGENT FOR POLYSTYRENE

[75] Inventor: Robert J. Scott, New City, N.Y.

[73] Assignee: Union Carbide Corporation, New York, N.Y.

[22] Filed: July 31, 1974

[21] Appl. No.: 493,420

[52] U.S. Cl. ....... 260/2.5 E; 260/2.5 HB; 260/2.5 B; 264/53; 264/DIG. 5
[51] Int. Cl.² ............................................. C08J 9/14
[58] Field of Search ..................... 260/2.5 B, 2.5 E

[56] References Cited
UNITED STATES PATENTS

| | | | |
|---|---|---|---|
| 2,816,827 | 12/1957 | Roth | 260/2.5 B |
| 2,848,428 | 8/1958 | Rubens | 260/2.5 B |
| 2,861,898 | 11/1958 | Platzer | 260/2.5 B |
| 2,911,382 | 11/1959 | Barkhuff, Jr. et al. | 260/2.5 B |
| 3,069,367 | 12/1962 | Beaulieu et al. | 260/2.5 B |
| 3,344,221 | 9/1967 | Moody et al. | 260/2.5 B |
| 3,505,248 | 4/1970 | Banks et al. | 260/2.5 B |

*Primary Examiner*—Morton Foelak
*Attorney, Agent, or Firm*—Eugene C. Trautlein

[57] ABSTRACT

This invention relates to the use of a methyl formate-trichloromonofluoromethane azeotrope as a blowing agent in producing polystyrene foam.

2 Claims, No Drawings

METHYL FORMATE-TRICHLOROMONOFLUOROMETHANE BLOWING AGENT FOR POLYSTYRENE

BACKGROUND OF THE INVENTION

Polystyrene foams have been produced employing volatile organic liquids, such as trichloromonofluoromethane, as blowing agents by extrusion. In such extrusion processes, it is desirable both to reduce the die pressure, so as to reduce energy requirements, and to maintain the molten polystrene at a relatively high temperature for a relatively prolonged period of time, so as to facilitate the production of products having intricate shapes using complex dies. Moreover, polystyrene foams are used as wood substitutes (e.g., in moldings and door frames) where tough and glossy surfaces are desirable. Further, it is desirable that polystyrene foam undergoes little cell collapse so as to retain its foam structure.

It is an object of this invention to provide a process for producing polystyrene foam having a tough glossy surface.

It is a further object of this invention to provide an extrusion process for producing polystyrene foam at a relatively low die pressure and with good heat retention by the molten foam.

It is a still further object of this invention to provide polystyrene foam that undergoes relatively little cell collapse.

Other objects of this invention will be apparent from the description thereof appearing below.

SUMMARY OF THE INVENTION

This invention provides a process for producing polystyrene foam which comprises: (1) forming a mixture of (a) a major amount of polystyrene and (b) minor amount of a liquid azeotrope consisting of 18 parts by weight of methyl formate and 82 parts by weight of trichloromonofluoromethane per 100 parts by weight of the azeotrope; and (2) maintaining the mixture at a temperature at which the azeotrope volatilizes to produce a polystyrene foam. In a preferred embodiment, this invention provides an extrusion process for producing polystyrene foam which comprises introducing polystyrene into an extruder, melting the polystyrene in the extruder at super atmospheric pressure, injecting into the melted polystyrene a minor amount of a liquid azeotrope consisting of 18 parts by weight of methyl formate and 82 parts by weight of trichloromonofluoromethane per 100 parts by weight of the azeotrope to form a polystyrene-azeotrope mixture and passing the mixture through a die to produce a polystyrene foam.

The amount of the azeotrope used is the amount required to produce a foam of the desired density.

The polystyrene suitable for use in the process of this invention is a normally-solid thermoplastic polymer and includes both styrene homopolymers and copolymers of a major amount of styrene and a minor amount of a copolymerizable ethylenically unsaturated monomer such as vinyl toluene, alpha-methylstyrene and acrylonitrile. Suitable polystyrene is commercially available as crystalline particles.

The process of this invention can be conducted in any suitable manner such as the known methods for producing thermoplastic foams as disclosed in U.S. Pat. Nos. 2,884,386; 3,160,688; 3,558,532, and 3,657,165.

Preferrably the process is conducted by the conventional extrusion technique. In this technique, the polystyrene and the azeotrope are mixed at elevated temperature and pressure in an extruder and then passed through a suitable die. A combination of two extruders in a series can be used with the polystyrene being melted and the azeotrope being introduced into the first extruder at a relatively high temperature and with the mixture so formed being cooled in the second extruder to increase the viscosity to facilitate processing through the die.

In the process of this invention nucleating agents, e.g., talc, can be used to facilitate the formation of gas bubbles from the azeotrope.

The polystyrene foam produced in accordance with the process of this invention can be fabricated as egg cartons, meat trays, packages, jackets for glass bottles and wood substitutes (e.g., moldings and door frames).

The following Examples illustrate the present invention.

EXAMPLE 1

Two polystyrene foams were produced: one using the above-described azeotrope as the blowing agent and, for purposes of comparison, one using trichloromonofluoromethane as the blowing agent. The polystyrene used was crystalline and is commercially available as "Amoco R-3" and contained, as a nucleating agent, 0.5 parts by weight of talc per 100 parts by weight of the polystyrene. The foams were made using a foam extruder, Model No. FM-232-001 made by the Gloucester Engineering Company, Inc. The extruder comprises a primary extruder having an internal diameter of 2 1/2½ and a length to diameter ratio of 30:1; and a secondary extruder having an internal diameter of 2 1/2½ and a length to diameter ratio of 24:1. Both extruders were screw machines. The blowing agents were introduced into the primary extruder from cylinders pressured to 100 pounds per square inch gage pressure with nitrogen. The polystyrene is fed into the primary extruder separately. The temperature in the primary extruder was 420°F. and the temperature in the secondary extruder was 280°–300° F. The pump pressure on the blowing agent was 3,500 pounds per square inch. The molten foam was passed through a profile die after leaving the secondary extruder. The following data were obtained:

|  | Trichloromonofluoromethane | Azeotrope |
|---|---|---|
| Blow Agent Injection Rate (cubic centimeters per minute) | 9.5 | 9.5 |
| Die Body Temperature (°F) | 275 | 275 |
| Die Pressure (pounds per square inch) | 1,000 | 600–700 |
| Polystyrene Throughput Rate (grams per minute) | 520 | 520 |
| Foam Cell Size | small | slightly larger |
| Foam Density (grams/cubic centimeter) | 0.1803 | 0.2261 |

The azeotrope gave a slower "blow" (i.e., it was released more slowly from the molten resin), produced a tougher, glossier surface, a larger cell size, a higher foam density and retained heat in the foam much longer. The latter is an advantage in forming and shaping the foam after extrusion. There was a remarkable drop in die pressure with the azeotrope. This normally is undesirable because it allows foaming to start inside the die before the melt comes out. With the azeotrope this did not occur, however, and the melt was exuded clear. Theoretically, this should increase efficiency of the screw and require less lower input for a given amount of foam. The larger cell size and a higher foam density and glossy surface produced with the azeotrope indicated that the azeotrope was releasing at a slower rate and seemed to be retained in the melt longer than the trichloromonofluoromethane.

EXAMPLE 2

Two additional polystyrene foams were produced from the blowing agents described in Example 1. The polystyrene used was general purpose polystyrene. The foams were produced in a 3.5 inch screw extruder operated at 400°F to 300°F. at the exit for 4 hours at a throughput of 400 pounds per hour. The azeotrope yielded slightly more gas per pound than the other blowing agent. The lower boiling point of the azeotrope prevented cell collapse at ambient temperatures. After polystyrene is foamed, it is aged for a period of time, usually 4 or 5 days, during which the blowing agent diffuses out and air diffuses in. If the ambient temperature is below the boiling point of the blowing agent, the blowing agent condenses before air can diffuse in and cell collapse and shrinkage occur. Thus, the azeotrope used in the process of the present invention, with a boiling point of 68°F. (compared to 75°F. for trichloromonofluoromethand), provides a better quality foam.

What is claimed is:

1. A process for producing polystyrene foam which comprises (1) forming a mixture of (a) a major amount of polystyrene and (b) minor amount of a liquid azeotrope consisting of 18 parts by weight of methyl formate and 82 parts by weight of trichloromonofluoromethane per 100 parts by weight of the azeotrope and (2) maintaining the mixture at a temperature at which the azeotrope volatilizes to produce a polystyrene foam.

2. An extrusion process for producing polystyrene foam which comprises introducing crystalline particulate polystyrene into an extruder, melting the polystyrene in the extruder at superatmospheric pressure, injecting into the melted polystyrene a minor amount of a liquid azeotrope consisting of 18 parts by weight of methyl formate and 82 parts by weight of trichloromonofluoromethane per 100 parts by weight of the azeotrope to form a polystyrene-azeotrope mixture and passing the mixture through a die to produce a polystyrene foam.

* * * * *

UNITED STATES PATENT OFFICE
CERTIFICATE OF CORRECTION

Patent No. 3,914,191          Dated Oct. 21, 1975

Inventor(s) R. J. Scott

It is certified that error appears in the above-identified patent and that said Letters Patent are hereby corrected as shown below:

Title of Patent on Cover Page and in Col. 1, Heading should be "METHYL FORMATE-TRICHLOROMONOFLUOROMETHANE BLOWING AGENT FOR POLYSTYRENE".

Col. 2, lines 33-34 should read "an internal diameter of 2 1/2" and ...".

Col. 2, lines 35-36 should read "an interal diameter of 2 1/2" and ...".

Col. 4, line 4 "trichloromonofluoromethand" should be "trichloromonofluoromethane".

Col. 4, line 5, insert in a new paragraph at the end of the specification: "As used herein, the symbol " denotes inches." .

Signed and Sealed this twentieth Day of April 1976

[SEAL]

Attest:

RUTH C. MASON
*Attesting Officer*

C. MARSHALL DANN
*Commissioner of Patents and Trademarks*